United States Patent
Hatada

(10) Patent No.: US 8,988,785 B2
(45) Date of Patent: Mar. 24, 2015

(54) ZOOM LENS WITH HIGH OPTICAL PERFORMANCE AND IMAGE PICKUP APPARATUS HAVING THE SAME

(71) Applicant: Canon Kabushiki Kaisha, Tokyo (JP)

(72) Inventor: Takahiro Hatada, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 64 days.

(21) Appl. No.: 13/804,277

(22) Filed: Mar. 14, 2013

(65) Prior Publication Data

US 2013/0194467 A1   Aug. 1, 2013

Related U.S. Application Data

(63) Continuation of application No. 12/787,019, filed on May 25, 2010, now Pat. No. 8,467,135.

(30) Foreign Application Priority Data

May 26, 2009   (JP) .................................. 2009-126206

(51) Int. Cl.
G02B 15/14   (2006.01)
G02B 15/173   (2006.01)
G02B 27/64   (2006.01)

(52) U.S. Cl.
CPC .............. G02B 15/14 (2013.01); G02B 15/173 (2013.01); G02B 27/646 (2013.01)
USPC ............................ 359/687; 359/676; 359/683

(58) Field of Classification Search
USPC .......................................... 359/687, 676, 683
See application file for complete search history.

(56) References Cited

U.S. PATENT DOCUMENTS

| | | | |
|---|---|---|---|
| 5,528,423 A * | 6/1996 | Arimoto et al. | 359/687 |
| 6,101,043 A | 8/2000 | Kohno et al. | |
| 6,975,461 B2 | 12/2005 | Eguchi | |
| 7,268,811 B2 * | 9/2007 | Shirasuna | 348/240.3 |
| 7,268,954 B2 | 9/2007 | Fujimoto | |
| 7,286,299 B2 * | 10/2007 | Matsui | 359/687 |
| 7,492,524 B2 | 2/2009 | Ito | |
| 7,532,412 B2 | 5/2009 | Hatada | |
| 8,054,560 B2 | 11/2011 | Lin et al. | |
| 2010/0296172 A1 | 11/2010 | Omichi | |

FOREIGN PATENT DOCUMENTS

| | | |
|---|---|---|
| JP | 07-159693 A | 6/1995 |
| JP | 2000-171712 A | 6/2000 |
| JP | 2001-091833 A | 4/2001 |

(Continued)

*Primary Examiner* — Jordan Schwartz

(74) *Attorney, Agent, or Firm* — Rossi, Kimms & McDowell LLP

(57) ABSTRACT

A zoom lens comprises a first lens unit having a positive refractive power, a second lens unit having a negative refractive power, and a rear group including at least two lens units and having a positive refractive power as a whole, in order from an object side to an image side. An interval of each of the lens units changes in a zoom operation, the rear group includes a lens unit R having a positive refractive power at the most image side, the lens unit R includes a lens having a concave surface at the image side and having an aspherical surface shape where a negative refractive power becomes stronger with increasing distance from an optical axis, and focal lengths f1, fR, and fw of the first lens unit, the lens unit R, and a whole system at a wide-angle end, respectively, are appropriately set.

7 Claims, 10 Drawing Sheets

(56) References Cited

FOREIGN PATENT DOCUMENTS

| | | |
|---|---|---|
| JP | 2001-228397 A | 8/2001 |
| JP | 2002-098895 A | 4/2002 |
| JP | 2003-322795 A | 11/2003 |
| JP | 2006-106191 A | 4/2006 |
| JP | 2006-227526 A | 8/2006 |
| JP | 2006-284763 A | 10/2006 |
| JP | 2007-093975 A | 4/2007 |
| JP | 2007-094177 A | 4/2007 |
| JP | 2007-226142 A | 9/2007 |
| JP | 2008-015251 A | 1/2008 |
| JP | 2008-216440 A | 9/2008 |
| JP | 2008-304952 A | 12/2008 |
| JP | 2009-058980 A | 3/2009 |
| JP | 2009-115958 A | 5/2009 |
| JP | 2009-300993 A | 12/2009 |

* cited by examiner

ZOOM LENS WITH HIGH OPTICAL PERFORMANCE AND IMAGE PICKUP APPARATUS HAVING THE SAME

BACKGROUND OF THE INVENTION

1. Field of the Invention

The present invention relates to a zoom lens which is used for an image pickup apparatus such as a digital camera, a video camera, a TV camera, or a film camera.

2. Description of the Related Art

As an image pickup optical system which is used for an image pickup apparatus such as a video camera or a digital still camera using a solid-state image pickup element, a zoom lens having a wide field angle and a high zoom ratio and also a high optical performance in a whole zoom range and in an overall object distance is required. Further, the zoom lens is required to have an anti-shake function which corrects an image shake generated by a camera shake or a hand jiggling.

A zoom lens which is constituted by four lens units having positive, negative, positive, and positive refractive powers in order from an object side to an image side is known (Japanese Patent Laid-open No. 2003-322795, and U.S. Pat. No. 6,975,461).

A zoom lens which is constituted by four lens units having positive, negative, positive, and positive refractive powers in order from the object side to the image side and is configured to move each lens unit to perform a zoom operation and also to have a part of the lens units functioned as an anti-shake lens unit is known (U.S. Pat. No. 7,268,954).

Further, a zoom lens which is constituted by five lens units of positive, negative, positive, negative, and positive powers in order from the object side to the image side, and is configured to move each lens unit to perform a zoom operation and also to have a part of the lens units functioned as an anti-shake lens unit is known (Japanese Patent Laid-open No. 2006-227526).

Commonly, in a zoom lens, a high zoom ratio can be obtained by a predetermined movement amount if a refractive power of a magnification varying lens unit is strengthened. Although the high zoom ratio is easily obtained by strengthening the refractive power of the magnification varying lens unit, an aberration variation caused by the zoom operation (magnification varying operation) becomes large and it is difficult to obtain a good optical performance in a whole zoom range. In order to widen the field angle, a zoom type may be configured so that a refractive power arrangement of a whole system becomes a retro-focus type in a zoom range at the wide-angle side. Although the field angle of the retro-focus type is easily widened, a large amount of an off-axis aberration is easily generated and it is difficult to obtain a high optical performance in a whole field angle because a whole lens system is asymmetric with respect to an aperture stop. On the other hand, as an anti-shake method of correcting an image shake caused by a hand jiggling, a method of moving a part of lens units of the zoom lens in a direction perpendicular to the optical axis does not have to add an optical system for the anti-shake operation and therefore it has an advantage that can easily perform the anti-shake operation. However, a space for arranging the anti-shake lens units is necessary and an decentration aberration is generated in performing the anti-shake operation, and therefore an image quality is deteriorated.

BRIEF SUMMARY OF THE INVENTION

The present invention provides a zoom lens having a wide field angle and a high zoom ratio and also a high optical performance in a whole zoom range, and an image pickup apparatus having the zoom lens. In addition, the present invention provides a zoom lens capable of maintaining a good image with the high zoom ratio in performing an anti-shake operation.

A zoom lens as one aspect of the present invention comprises a first lens unit having a positive refractive power, a second lens unit having a negative refractive power, and a rear group including at least two lens units and having a positive refractive power as a whole, in order from an object side to an image side. An interval of each of the lens units is configured to change in a zoom operation. The rear group includes a lens unit R having a positive refractive power at the most image side. The lens unit R includes a lens having a concave surface at the image side and having an aspherical surface shape where a negative refractive power becomes stronger with increasing distance from an optical axis. The following conditional expressions are satisfied, where f1 is a focal length of the first lens unit, fR is a focal length of the lens unit R, and fw is a focal length of a whole system at a wide-angle end.

$$4.4 < f1/fw < 5.5$$

$$1.5 < fR/fw < 2.5$$

An image pickup apparatus as another aspect of the present invention comprises the zoom lens and a solid-state image pickup element configured to receive light of an image formed by the zoom lens.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention of a zoom lens and an image pickup apparatus having the same will be described below with reference to the accompanied drawings. The zoom lens of the present invention includes a first lens unit having a positive refractive power, a second lens unit having a negative refractive power, and a rear group including at least two lens units and having a positive refractive power as a whole, in order from an object side to an image side. In a zoom operation, an interval of each of the lens units changes.

Figure 1:
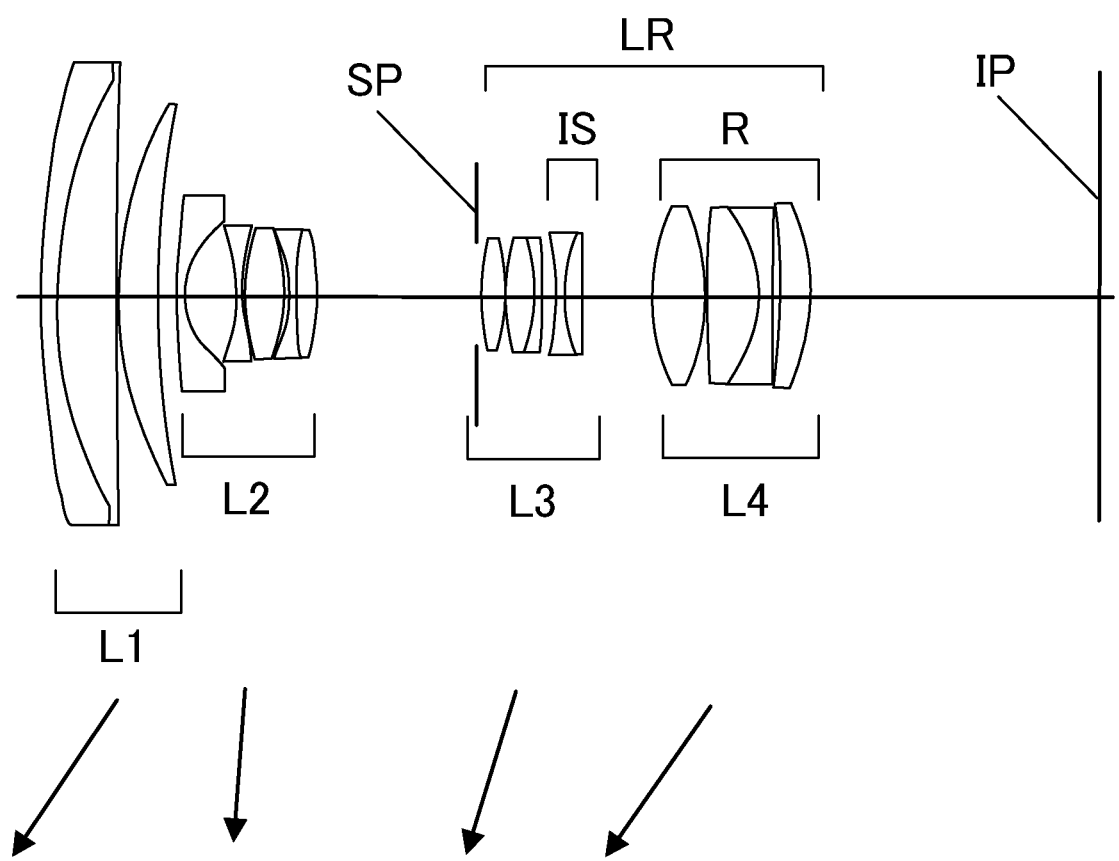
FIG. 1 is a cross-sectional diagram of a zoom lens at a wide-angle end in Embodiment 1.
Figure 2A:
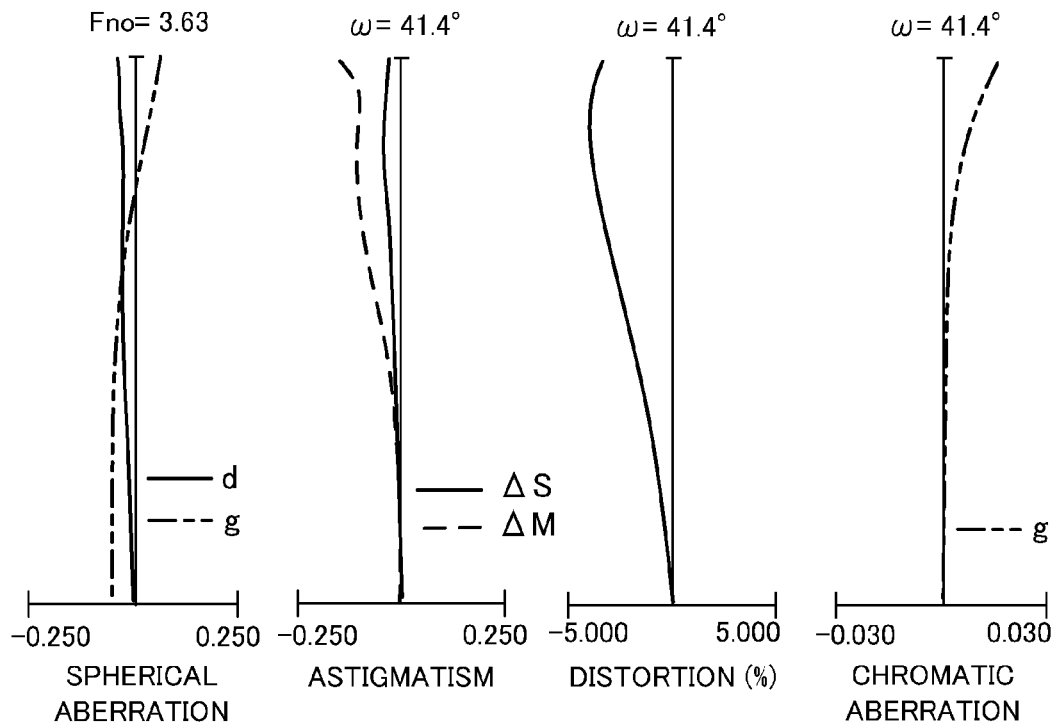
FIGS. 2A and 2B are aberration diagrams of a zoom lens in Embodiment 1.
Figure 2B:
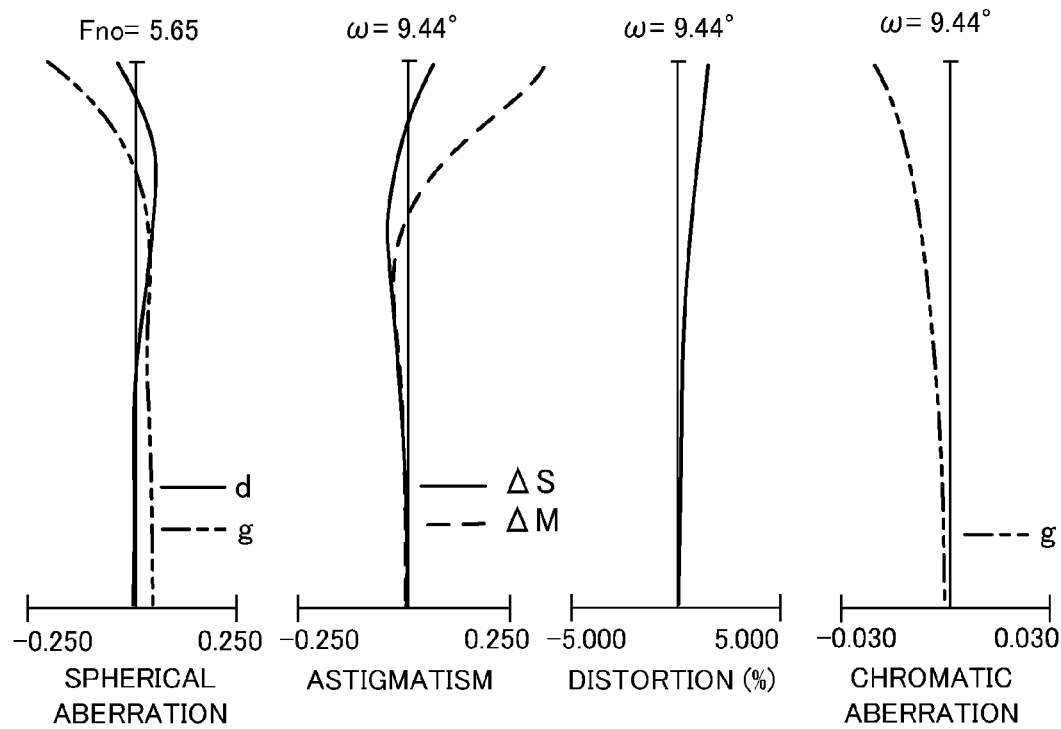
Figure 3A:
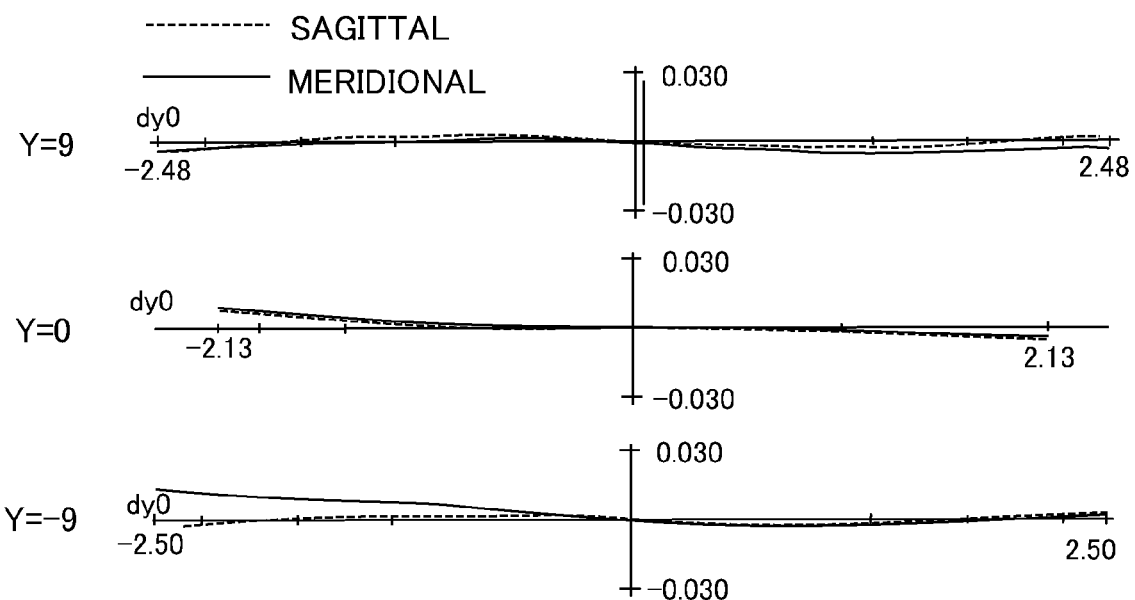
FIGS. 3A and 3B are aberration diagrams of a zoom lens when performing shake correction in Embodiment 1.
Figure 3B:
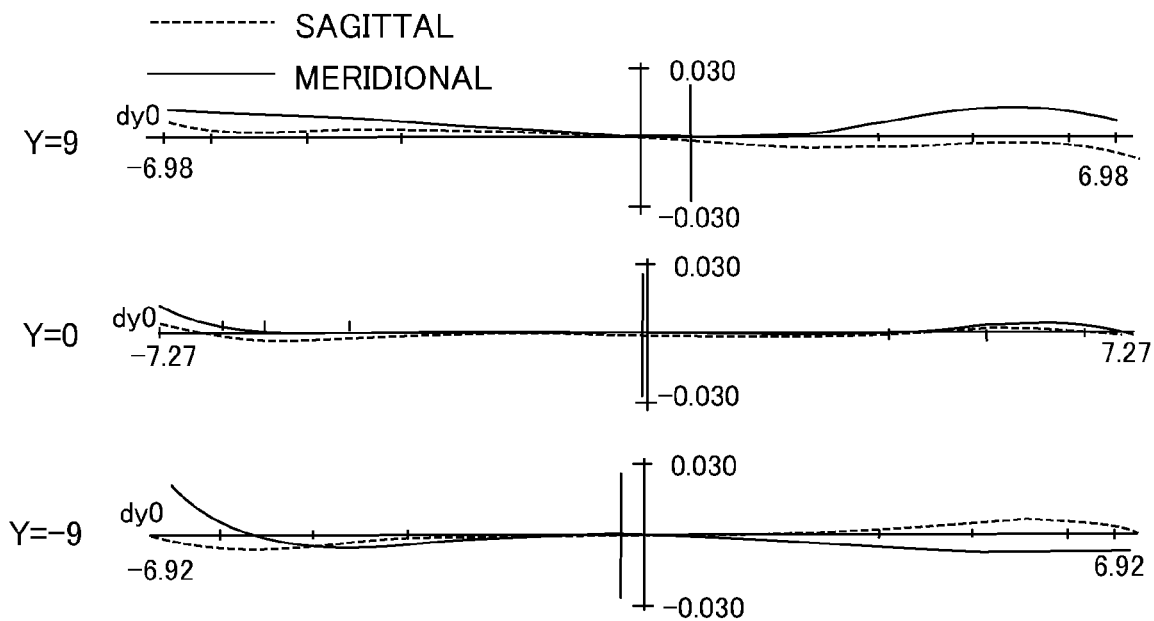
Figure 4:
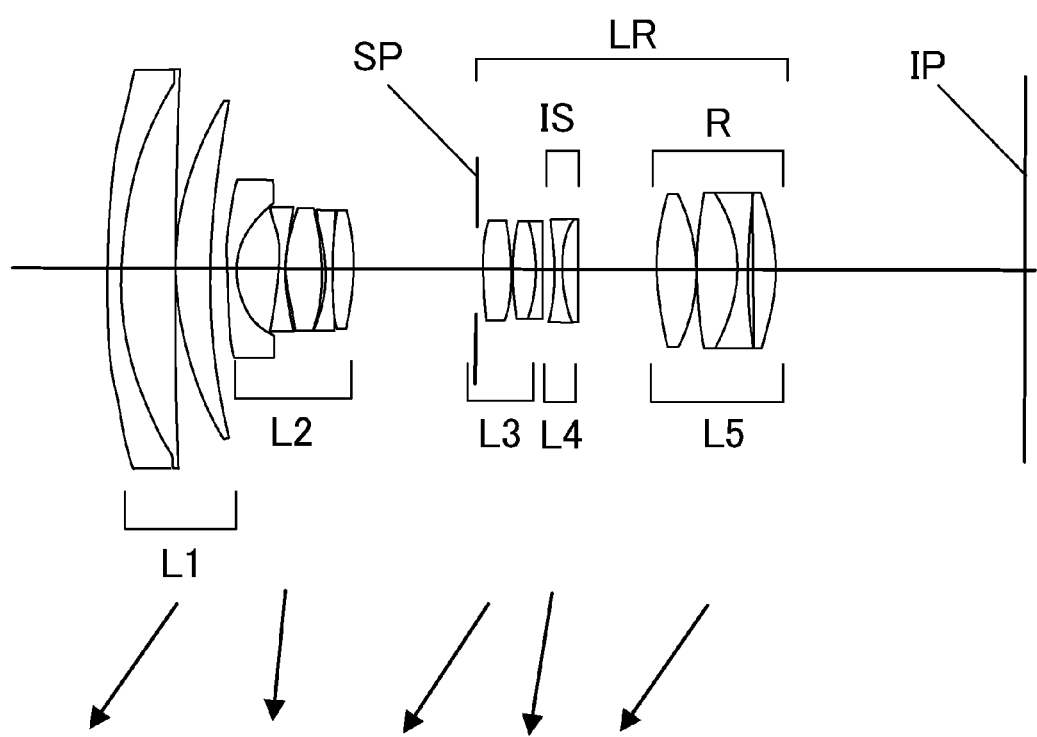
FIG. 4 is a cross-sectional diagram of a zoom lens at a wide-angle end in Embodiment 2.
Figure 5A:
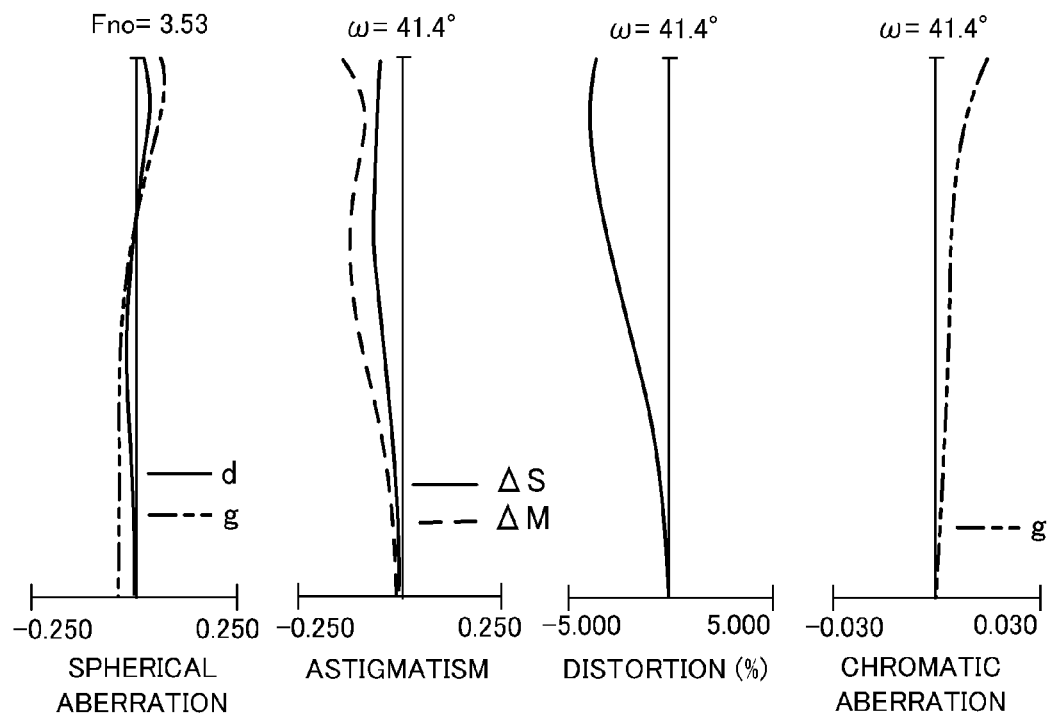
FIGS. 5A and 5B are aberration diagrams of a zoom lens in Embodiment 2.
Figure 5B:
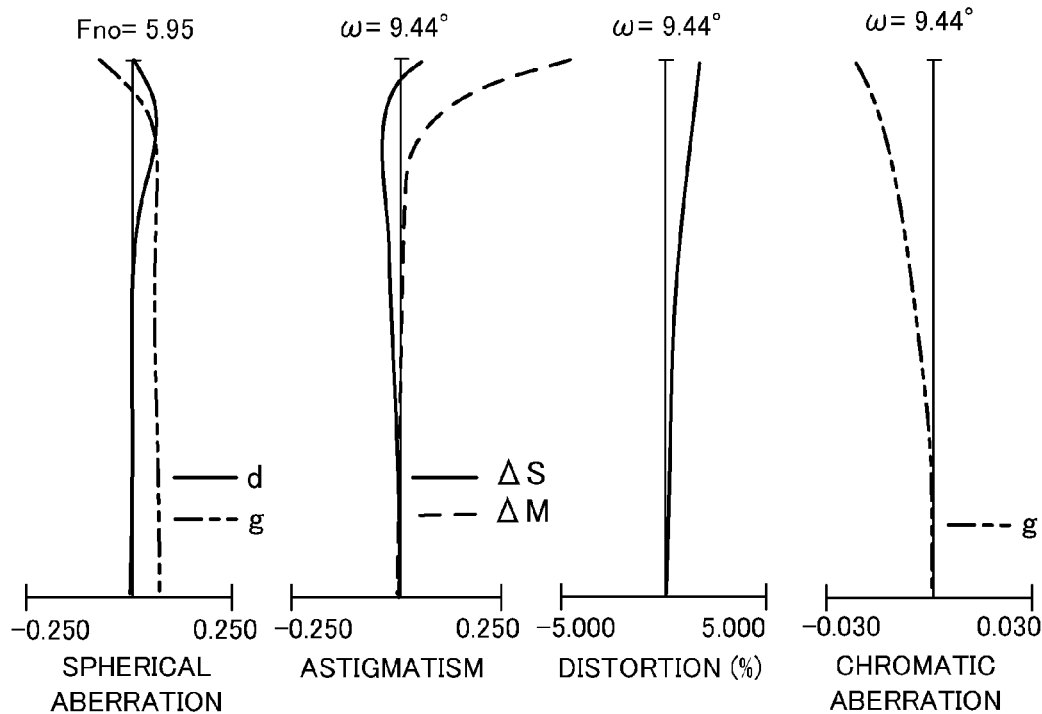
Figure 6A:
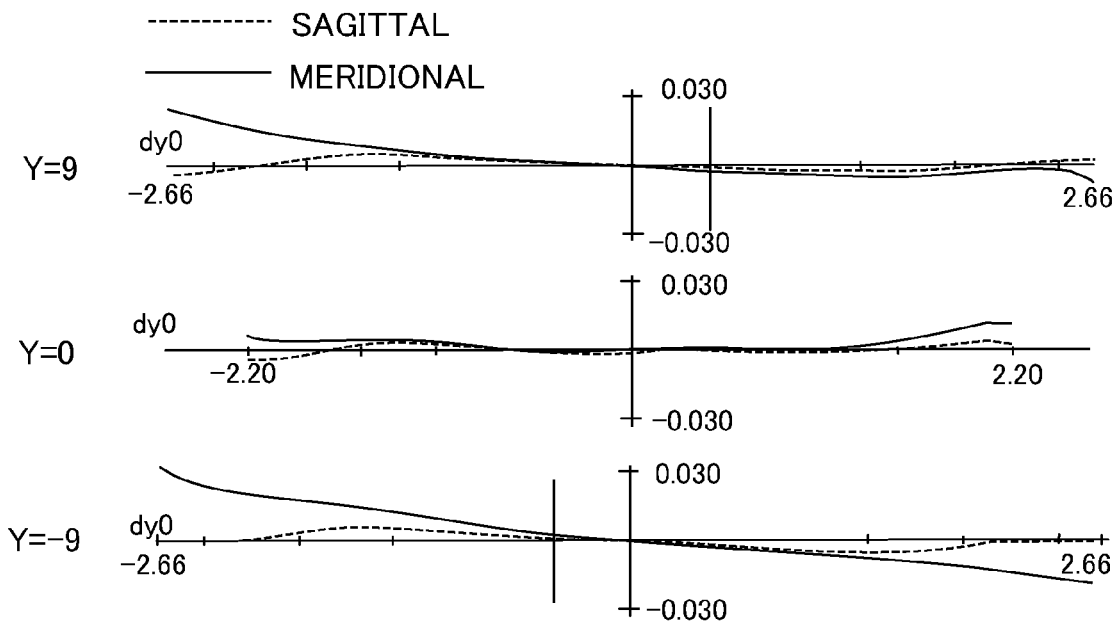
FIGS. 6A and 6B are aberration diagrams of a zoom lens when performing shake correction in Embodiment 2.
Figure 6B:
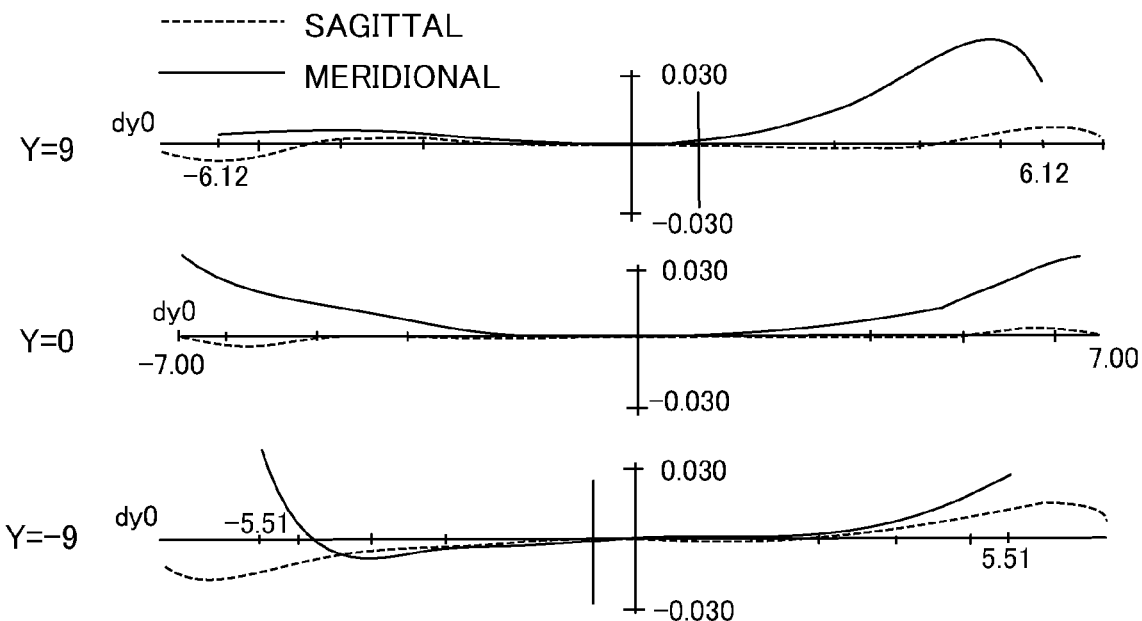
Figure 7:
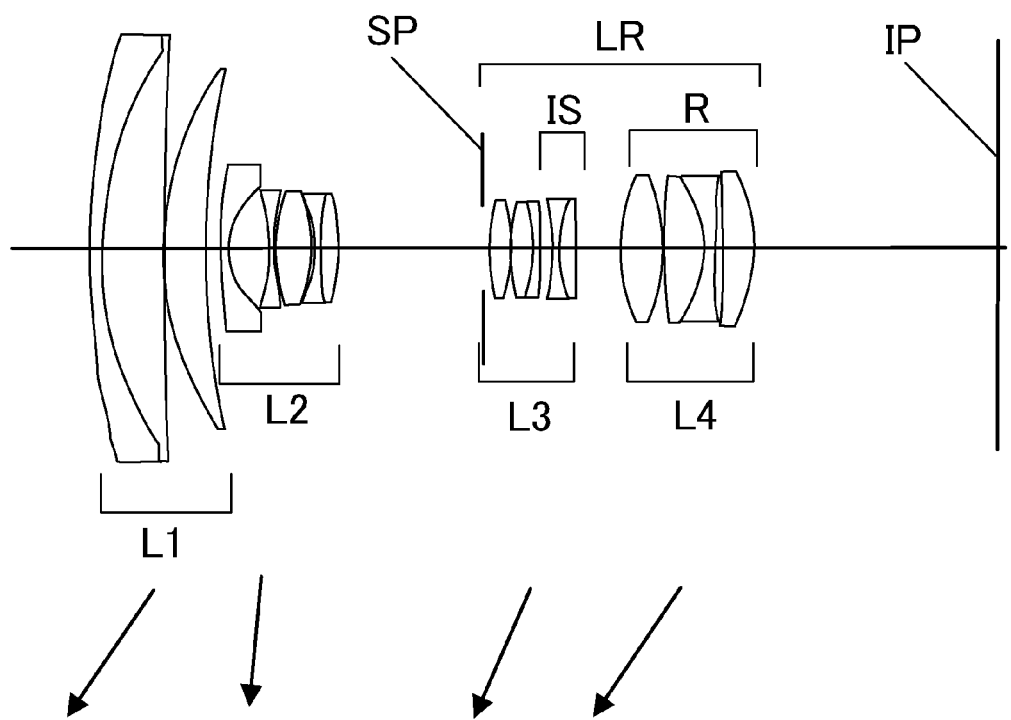
FIG. 7 is a cross-sectional diagram of a zoom lens at a wide-angle end in Embodiment 3.
Figure 8A:
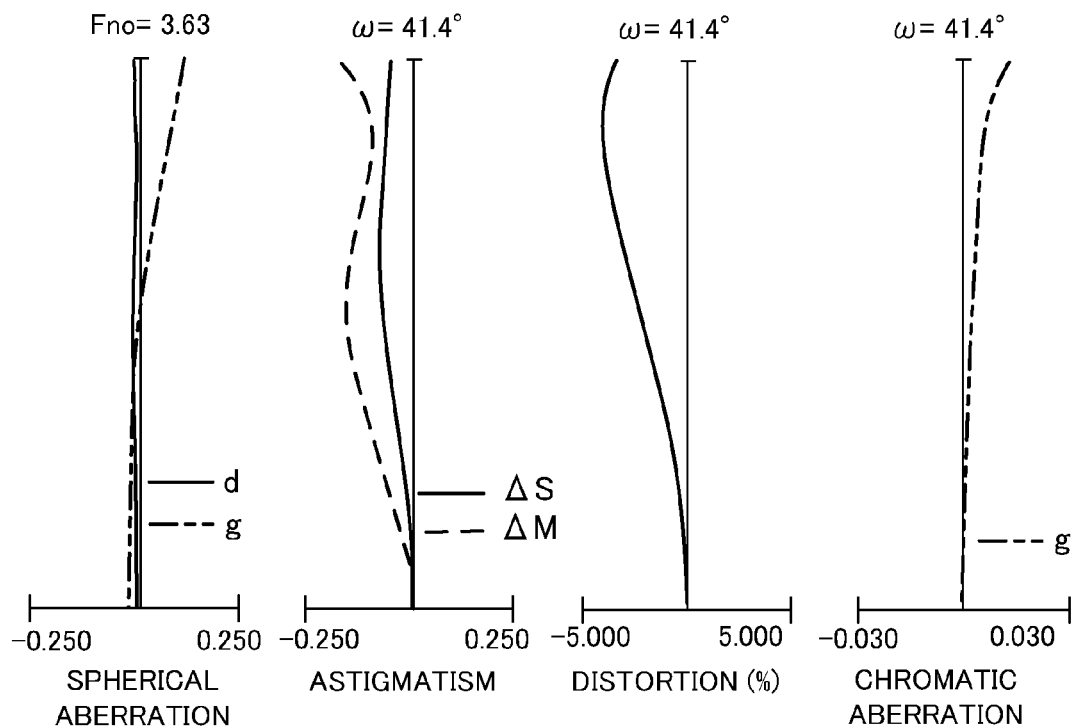
FIGS. 8A and 8B are aberration diagrams of a zoom lens in Embodiment 3.
Figure 8B:
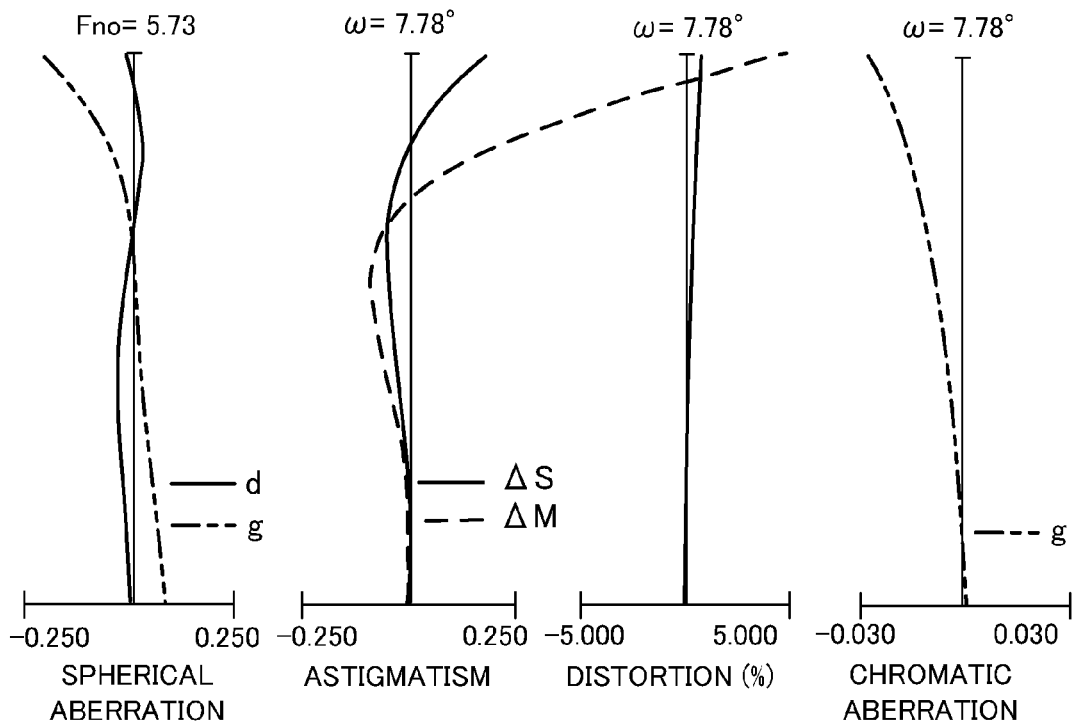
Figure 9A:
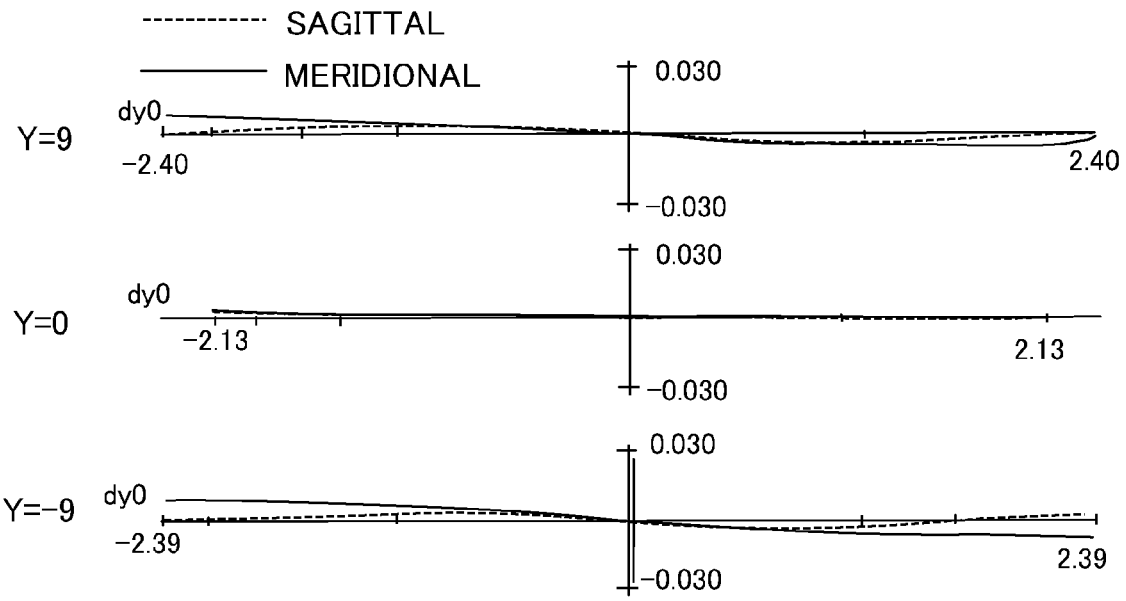
FIGS. 9A and 9B are cross-sectional diagrams of a zoom lens at a wide-angle end in Embodiment 3.
Figure 9B:
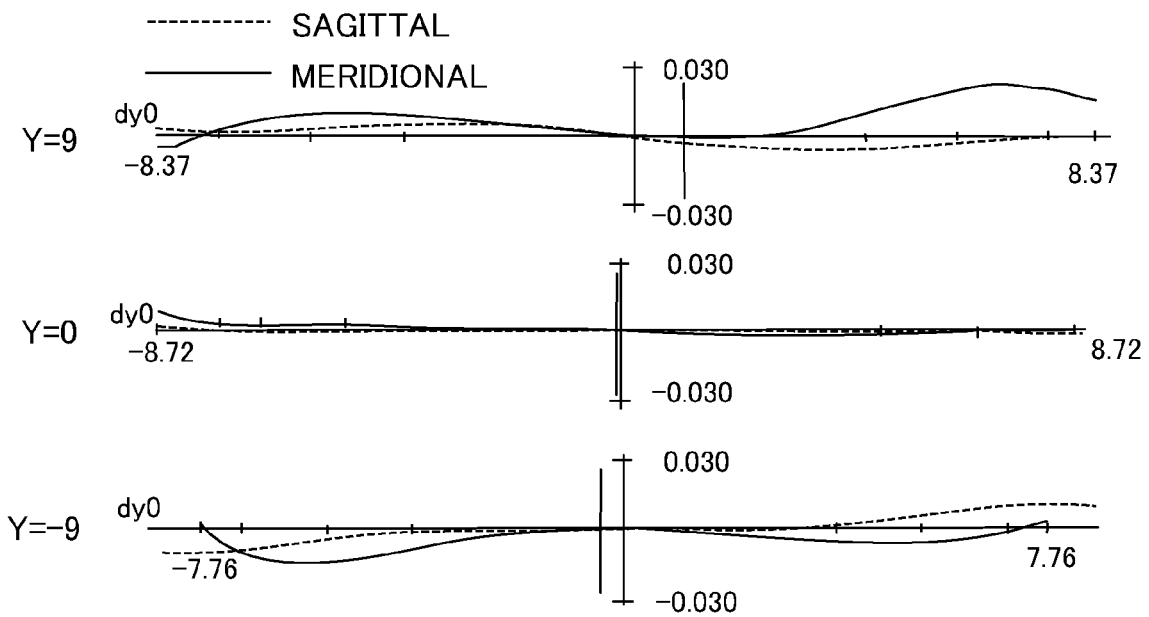
Figure 10:
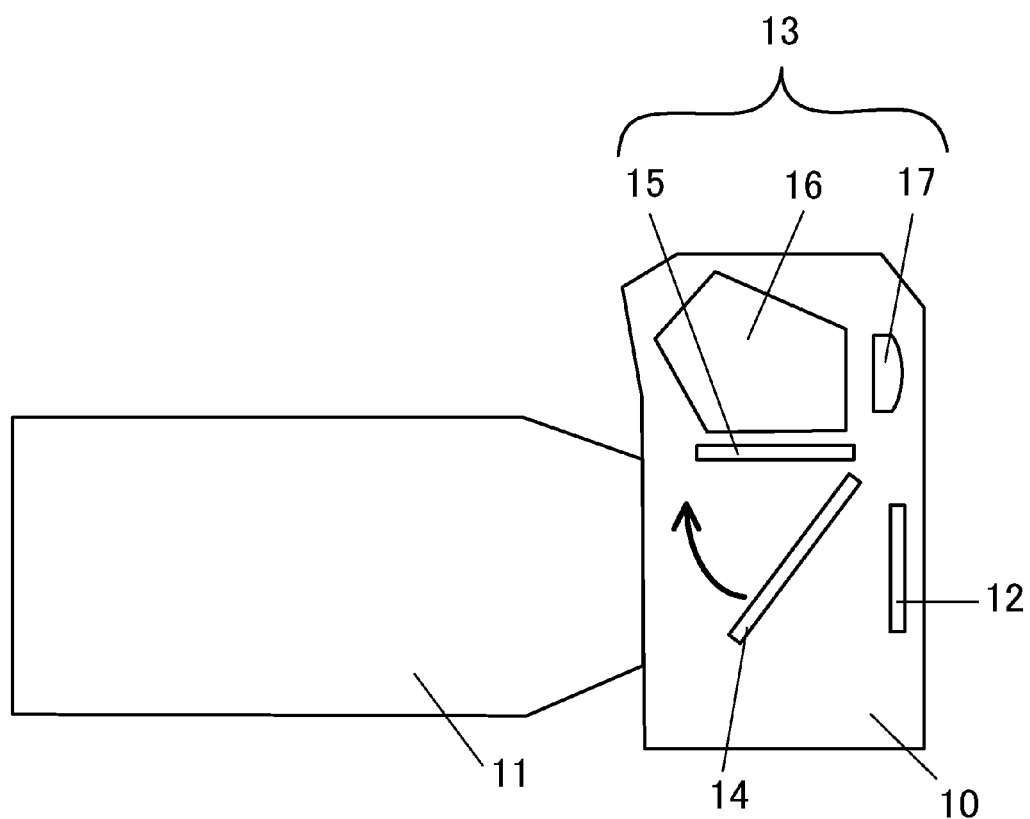
FIG. 10 is a schematic diagram of an image pickup apparatus in the present invention.

FIG. 1 is a cross-sectional diagram of a zoom lens at a wide-angle end (a short focal length end) which focuses on an infinite object in Embodiment 1 of the present invention. FIGS. 2A and 2B are longitudinal aberration diagrams of the zoom lens which focuses on the infinite object at the wide-angle end and a telephoto end (a long focal length end) respectively in Embodiment 1. FIGS. 3A and 3B are lateral aberration diagrams of the zoom lens which focuses on the infinite object and is stabilized (when correcting an image shake) on condition that is tilted by 0.3° at the wide-angle end and the telephoto end respectively in Embodiment 1. FIG. 4 is a cross-sectional diagram of the zoom lens which focuses on the infinite object at the wide-angle end in Embodiment 2 of the present invention. FIGS. 5A and 5B are longitudinal aberration diagrams of the zoom lens which focuses on the infinite object at the wide-angle end and the telephoto end respectively in Embodiment 2. FIGS. 6A and 6B are lateral aberration diagrams of the zoom lens which focuses on the infinite object and is stabilized on condition that is tilted by 0.3° at the wide-angle end and the telephoto end respectively in Embodiment 2. FIG. 7 is a cross-sectional diagram of a zoom lens at a wide-angle end which focuses on an infinite object in Embodiment 3 of the present invention. FIGS. 8A and 8B are longitudinal aberration diagrams of the zoom lens which focuses on the infinite object at the wide-angle end and a telephoto end respectively in Embodiment 3. FIGS. 9A and 9B are lateral aberration diagrams of the zoom lens which focuses on the infinite object and is stabilized (when correcting an image shake) on condition that is tilted by 0.3° at the wide-angle end and the telephoto end respectively in Embodiment 3. FIG. 10 is a main schematic diagram of a camera (an image pickup apparatus) which includes the zoom lens of the present invention.

The zoom lens of each embodiment is an imaging lens system which is used for an image pickup apparatus such as a video camera, a digital camera, a TV camera, or a silver salt film camera. In the cross-sectional diagrams of the zoom lens, the left hand indicates an object side (a front side) and the right hand indicates an image side (a rear side). In the cross-sectional diagrams of the zoom lens, reference code "i" denotes an order of lens units from the object side, and reference code "Li" denotes an i-th lens unit. In the cross-sectional diagrams of the zoom lens of FIGS. 1 and 7, reference code "L1" denotes a first lens unit having a positive refractive power and reference code "L2" denotes a second lens unit having a negative refractive power. Reference code "LR" denotes a rear group, which is constituted by a third lens unit L3 having a positive refractive power and a fourth lens unit L4 having a positive refractive power. The refractive power means an optical power, which is an inverse of a focal length.

In the lens cross-sectional diagram of FIG. 4, reference code "L1" denotes a first lens unit having a positive refractive power, and reference code "L2" denotes a second lens unit having a negative refractive power. Reference code "LR" denotes a rear group, which is constituted by a third lens unit L3 having a positive refractive power, a fourth lens unit L4 having a negative refractive power, and a fifth lens unit L5 having a positive refractive power. Reference code "SP" denotes an aperture stop, which is arranged at the object side of the third lens unit L3. Reference code "IS" denotes an anti-shake lens unit which moves a shot image. Reference code "IP" is an image plane on which a photosensitive surface corresponding to an image pickup surface of a solid-state image pickup element (a photoelectric conversion element) such as a CCD sensor or a CMOS sensor when it is used for an image pickup optical system of a video camera or a digital still camera, or corresponding to a film surface when it is used for a silver salt film camera is disposed.

In the aberration diagrams, reference codes "d" and "g" denote "d-line" and "g-line", respectively. Reference codes "ΔM" and "ΔS" denote meridional image plane and sagittal image plane, respectively. A chromatic aberration of magnification is represented by the g-line. Reference code "ω" denotes a half field angle, and reference code "Fno" denotes an F-number. In the lateral aberration diagram, reference code "Y" denotes an image height. A solid line indicates the meridional image plane, and a dashed line indicates the sagittal image plane. Further, in the lateral aberration diagram, a lateral axis indicates a height on a pupil plane. In each embodiment described below, the wide-angle end and the telephoto end are defined as zoom positions when each lens unit is structurally positioned at both ends in a range movable on an optical axis. Arrows indicate movement loci of respective lens units in a zoom operation from the wide-angle end to the telephoto end.

As indicated by the arrow, the first lens unit L1 moves to the object side in a zoom operation from the wide-angle end to the telephoto end in Embodiments 1 and 3 shown in FIGS. 1 and 7, respectively. The second lens unit L2 moves to the object side or the image side while widening an interval between the first lens unit L1 and the second lens unit L2. The third lens unit L3 moves to the object side while narrowing an interval between the second lens unit L2 and the third lens unit L3. The fourth lens unit L4 moves to the object side while narrowing an interval between the third lens unit L3 and the fourth lens unit L4. The aperture stop SP moves integrally with the third lens unit L3.

In Embodiment 2 shown in FIG. 4, as indicated by the arrow, the first lens unit L1 moves to the object side in a zoom operation from the wide-angle end to the telephoto end. The second lens unit L2 moves to the object side or the image side while widening an interval between the first lens unit L1 and the second lens unit L2. The third lens unit L3 moves to the object side while narrowing an interval between the second lens unit L2 and the third lens unit L3. The fourth lens unit L4 moves to the object side while widening an interval between the third lens unit L3 and the fourth lens unit L4. The fifth lens unit L5 moves to the object side while narrowing an interval between the fourth lens unit L4 and the fifth lens unit L5. The aperture stop SP moves integrally with the third lens unit L3. In each embodiment, a focusing is performed by moving the second lens unit L2 in an optical axis direction. The focusing may also be performed by moving a whole of the zoom lens or an arbitrary one lens unit.

Each of a lens unit IS that is a part of the third lens unit L3 in Embodiments 1 and 3 shown in FIGS. 1 and 7 respectively, and a lens unit IS that is all of the fourth lens unit L4 in Embodiment 2 shown in FIG. 4 is the anti-shake lens unit. In each embodiment, the lens unit IS moves in a direction having a component of a direction perpendicular to an optical axis to correct an image shake generated when a whole of the zoom lens is shaken as a result of changing an imaging position in a direction substantially perpendicular to the optical axis. In other words, the lens unit IS performs an anti-shake operation.

Next, characteristics of each embodiment will be described. In each embodiment, the rear group LR includes a lens unit R having a positive refractive power at the most image side. The lens unit R having the positive refractive power at the most image side includes a lens having an aspherical surface shape where a surface at the image side has a concave shape and a negative refractive power is strengthened with increasing distance from the optical axis. In order to reduce the size of the whole of the zoom lens, it is effective that the refractive power of each lens unit is strengthened. In particular, in order to reduce a lens effective diameter, it is effective that the refractive powers of the first lens unit and the second lens unit are strengthened.

When the size of the whole of the zoom lens is reduced and an imaging field angle is widened, a large amount of sagittal coma aberration is generated at the wide-angle end and therefore it is difficult to correct the aberration. In order to well correct the sagittal coma aberration at the wide-angle end, it is effective that a lens having a surface of a concave shape at the image side is arranged in a final lens unit R where an incident height hb of an off-axis principal ray is large. However, in a zoom lens having a large zoom ratio and a long focal length at the telephoto end, when a lens having a surface of a concave shape at the image side is arranged in the final lens unit R, a spherical aberration is generated at the telephoto end and it is difficult to correct the aberration. Therefore, the surface of the concave shape is an aspherical surface shape having a negative refractive power which is weak at a center of the lens and is strengthened with increasing distance from the optical axis to well correct the spherical aberration at the telephoto end and the off-axis sagittal coma aberration at the wide-angle end.

In the zoom lens of each embodiment, the following conditional expressions are satisfied, where f1 is a focal length of the first lens unit L1, fR is a focal length of the lens unit R, and fw is a focal length of a whole system at the wide-angle end.

$$4.4 < f1/fw < 5.5 \quad (1)$$

$$1.5 < fR/fw < 2.5 \quad (2)$$

Conditional expression (1) is used for realizing a high optical performance in a whole screen and also reducing the size of the whole system on condition that variations of various kinds of aberrations caused by performing a zoom operation are small in a whole zoom range. Conditional expression (1) defines a focal length of the first lens unit L1 which moves in the zoom operation. When conditional expression (1) exceeds the upper limit, a total lens length increases and also a movement amount of the first lens unit L1 for a magnification varying operation increases. As a result, it is difficult to reduce the size of the whole system. On the other hand, when conditional expression (1) exceeds the lower limit, it is difficult to correct a spherical aberration at the telephoto end.

Conditional expression (2) defines a focal length of the lens unit R having a positive refractive power at the most image side of the rear group LR. When conditional expression (2) exceeds the upper limit, it is difficult to ensure a back focus having a predetermined length at the wide-angle end. On the other hand, conditional expression (2) exceeds the lower limit, particularly it is difficult to reduce a negative distortion aberration at the wide-angle end. Preferably, numerical ranges of conditional expressions (1) and (2) are set as follows.

$$4.6 < f1/fw < 5.3 \quad (1a)$$

$$1.8 < fR/fw < 2.3 \quad (2a)$$

In each embodiment, a zoom lens capable of obtaining a high optical performance at a wide field angle and with a high zoom ratio in a whole zoom range is achieved by the configuration as described above. In the zoom lens of each embodiment, preferably, at least one of the following conditional expressions is satisfied. Thus, an effect corresponding to each conditional expression can be obtained.

The lens unit R includes a lens Rp having a positive refractive power at the most object side, and a focal length of the lens Rp is defined as fRp. A refractive index of a material of a lens having an aspherical surface shape in the lens unit R is defined as Na. A focal length of the second lens unit L2 is defined as f2, and a focal length of the whole system at the telephoto end is defined as ft. In this case, preferably, at least one of the following conditional expressions is satisfied.

$$0.6 < fRp/fR < 1.2 \quad (3)$$

$$1.8 < Na < 2.0 \quad (4)$$

$$0.05 < |f2/ft| < 0.20 \quad (5)$$

When conditional expression (3) exceeds the upper limit, the refractive power of the lens Rp is too weak and therefore it is difficult to correct a spherical aberration that is generated on an aspherical surface in the lens unit R and that shows an over-tendency at the telephoto end. On the other hand, when conditional expression (3) exceeds the lower limit, it is difficult to correct a coma aberration and a field curvature.

When conditional expression (4) exceeds the lower limit, it is difficult to well correct an off-axis sagittal aberration at the wide-angle end. Further, it is not good because a radius of curvature of the aspherical surface at a peripheral side of the lens is too strong and therefore it is difficult to fabricate the aspherical lens.

Conditional expression (5) defines a focal length of the second lens unit L2. When conditional expression (5) exceeds the upper limit, a movement amount of the first lens unit L1 has to be enlarged due to the magnification varying operation, and as a result, it is not good because the total lens length is long at the telephoto end. Or it is difficult to reduce the size of the whole system because the movement amount is too large in a zooming operation for the first lens unit L1. On the other hand, when conditional expression (5) exceeds the lower limit, it is advantageous in increasing the zoom ratio, but it is difficult to correct astigmatism in the whole zoom range because Petzval sum increases in a negative direction.

Preferably, numerical ranges of conditional expressions (3) to (5) are set as follows.

$$0.7 < fRp/fR < 1.1 \quad (3a)$$

$$1.82 < Na < 1.90 \quad (4a)$$

$$0.10 < |f2/ft| < 0.18 \quad (5a)$$

In each embodiment, the lens configuration is specified as described above to have a wide field angle where an imaging field angle at the wide-angle end is around 84° and also to have a zoom ratio equal to or greater than five times to maintain a good optical performance in the whole zoom range. Further, a zoom lens where the size of the whole system is small and an image pickup apparatus having the zoom lens can be obtained.

In Embodiments 1 and 3 shown in FIGS. 1 and 7 respectively, the first lens unit L1 is constituted by a cemented lens which is made by cementing a negative lens whose surface at the image side has a concave shape and a positive lens, and a positive lens having a convex lens at the object side and having a meniscus shape, in order from the object side to the image side. The second lens unit L2 is constituted by a negative lens which is made by stacking negative lenses constituted by resin and having aspherical shapes and has a meniscus shape of a concave surface at the image side, a negative lens having a biconcave shape, a positive lens having a biconvex shape, and a cemented lens which is made by cementing a negative lens having a biconcave shape and a positive lens having a convex shape, in order from the object side to the image side. The second lens unit L2 has such a lens configuration to reduce its aberration variation in focusing and zooming operations.

The third lens unit L3 is constituted by a positive lens having a biconvex shape, a cemented lens which is made by cementing a positive lens having a biconvex shape and a negative lens, and a cemented lens (a lens unit IS) which is made by cementing a negative lens having a concave shape and a positive lens, in order from the object side to the image side. The lens unit IS is configured to have a negative lens having an aspherical surface shape and a positive lens. Thus, when the lens unit IS moves in a direction which has a component perpendicular to an optical axis direction to move an imaging position in a direction perpendicular to the optical axis, i.e. in an anti-shake correction, a decentration aberration is reduced and also the reduction of the optical performance is prevented.

The fourth lens unit L4 is constituted by a positive lens having a biconvex shape, a cemented lens which is made by cementing a positive lens and a negative lens, and a positive lens whose surface at the image side has a convex shape, in order from the object side to the image side. In Embodiment 2 shown in FIG. 4, the lens configurations of the first and second lens units L1 and L2 are the same as those of Embodiments 1 and 3 shown in FIGS. 1 and 7, respectively. The third lens unit L3 is constituted by a positive lens having a biconvex shape and a cemented lens which is made of cementing a positive lens having a biconvex shape and a negative lens. The fourth lens unit L4 is constituted by a cemented lens (a lens unit IS) which is made of cementing a negative lens having a biconcave shape and a positive lens. The lens unit IS has a negative lens which includes a surface of an aspherical shape and a positive lens. Thus, when the lens unit IS moves in a direction having a component perpendicular to the optical axis direction to move the imaging position in a direction perpendicular to the optical axis, i.e. at the time of performing an anti-shake correction, the decentration aberration is reduced and the decrease of the optical performance is prevented.

The fifth lens unit L5 is constituted by a positive lens having a biconvex shape, a cemented lens which is made by cementing a positive lens and a negative lens, and a positive lens whose surface at the image side has a convex shape, in order from the object side to the image side.

Embodiment

Hereinafter, Numerical embodiments 1 to 3 which correspond to Embodiment 1 to 3 respectively are shown. In each numerical embodiment, reference code "i" denotes an order of a surface from the object side, reference code "ri" denotes an i-th (an i-th surface) radius of curvature, and reference code "di" denotes an interval between the i-th surface and the (i+1)-th surface. Reference codes "ndi" and "vdi" denote a refractive index and Abbe's number of a material of an i-th optical member based on a d-line, respectively. Reference code "BF" denotes a back focus which is obtained by performing an air conversion. In aspherical surface data, aspherical surface coefficients which are represented by the following expression are indicated.

$$x = \frac{\frac{h^2}{R}}{1+\sqrt{1-(1+k)\left(\frac{h}{R}\right)^2}} + c_4 h^2 + c_6 h^2 + c_8 h^2 + c_{10} h^2 + c_{12} h^2$$

In the expression, "x" is a displacement from a reference surface in an optical axis direction. "h" is a height in a direction perpendicular to the optical axis. "R" is a radius of a quadric surface that is a base. "k" is a conic constant. "Cn" is an n-th order aspherical surface coefficient. The indication of "E-Z" means "$10^{-Z}$". Further, the relationships between each of conditional expressions and numerical values in the numerical embodiments are shown in Table 1.

Numerical Embodiment 1

| Unit mm | | | | |
|---|---|---|---|---|
| Surface data | | | | |
| Surface number | r | d | nd | vd |
| 1 | 110.658 | 1.90 | 1.84666 | 23.8 |
| 2 | 52.161 | 7.36 | 1.61800 | 63.4 |
| 3 | 663.281 | 0.15 | | |
| 4 | 45.167 | 4.99 | 1.80400 | 46.6 |
| 5 | 113.249 | (variable) | | |
| 6* | 102.442 | 0.05 | 1.51640 | 52.2 |
| 7 | 66.977 | 1.20 | 1.88300 | 40.8 |
| 8 | 10.556 | 5.90 | | |
| 9 | −23.955 | 0.90 | 1.88300 | 40.8 |
| 10 | 34.604 | 0.15 | | |
| 11 | 25.180 | 4.80 | 1.80610 | 33.3 |
| 12 | −25.180 | 0.48 | | |
| 13 | −18.860 | 0.90 | 1.80400 | 46.6 |
| 14 | 62.131 | 2.59 | 1.80518 | 25.4 |
| 15 | −33.902 | (variable) | | |
| 16(stop) | ∞ | 0.68 | | |
| 17 | 33.342 | 2.75 | 1.62588 | 35.7 |
| 18 | −33.342 | 0.15 | | |
| 19 | 33.575 | 3.50 | 1.49700 | 81.5 |
| 20 | −19.990 | 0.90 | 1.84666 | 23.8 |
| 21 | −818.039 | (variable) | | |
| 22* | −36.765 | 1.10 | 1.85135 | 40.1 |
| 23 | 20.008 | 2.15 | 1.84666 | 23.8 |
| 24 | 149.653 | (variable) | | |
| 25 | 26.110 | 6.30 | 1.48749 | 70.2 |
| 26 | −26.110 | 0.15 | | |
| 27 | 115.344 | 6.35 | 1.48749 | 70.2 |
| 28 | −16.183 | 1.60 | 1.85006 | 40.2 |
| 29* | 490.723 | 0.92 | | |
| 30 | −118.547 | 3.80 | 1.48749 | 70.2 |
| 31 | −25.929 | (variable) | | |
| Image plane | ∞ | | | |

| Aspherical surface data | | |
|---|---|---|
| Sixth surface | | |
| K = 0.00000e+000 | A 4 = 3.56265e−005 | A 6 = −1.52365e−007 |
| A 8 = 3.65770e−010 | A10 = −5.64258e−013 | |
| Twenty-second surface | | |
| K = 0.00000e+000 | A 4 = 9.33559e−006 | A 6 = −3.71157e−008 |
| A 8 = 1.13092e−009 | A10 = −1.10840e−011 | |
| Twenty-ninth surface | | |
| K = 0.00000e+000 | A 4 = 2.25534e−005 | A 6 = 8.49121e−009 |
| A 8 = −4.05465e−011 | A10 = −4.31560e−013 | |

| Various kinds of data | | | |
|---|---|---|---|
| Zoom ratio 5.30 | | | |
| | Wide angle | Intermediate | Telephoto |
| Focal length | 15.50 | 34.96 | 82.17 |
| F-number | 3.63 | 4.64 | 5.65 |
| Field angle | 41.39 | 21.34 | 9.44 |
| Image height | 13.66 | 13.66 | 13.66 |
| Total lens length | 129.61 | 147.29 | 169.61 |
| BF | 35.46 | 50.70 | 65.11 |
| d 5 | 2.30 | 19.06 | 35.33 |
| d15 | 19.62 | 9.05 | 2.36 |
| d24 | 8.73 | 4.99 | 3.31 |
| d31 | 35.46 | 50.70 | 65.11 |

-continued

Unit mm

Focal length of each unit

| Unit | Start surface | Focal length |
|---|---|---|
| 1 | 1 | 75.57 |
| 2 | 6 | −11.76 |
| 3 | 16 | 64.72 |
| 4 | 25 | 32.02 |

Numerical Embodiment 2

Surface data

| Surface number | r | d | nd | vd |
|---|---|---|---|---|
| 1 | 104.486 | 1.90 | 1.84666 | 23.8 |
| 2 | 51.175 | 7.33 | 1.61800 | 63.4 |
| 3 | 390.135 | 0.15 | | |
| 4 | 44.425 | 5.07 | 1.80400 | 46.6 |
| 5 | 104.789 | (variable) | | |
| 6* | 144.729 | 0.05 | 1.51640 | 52.2 |
| 7 | 73.635 | 1.20 | 1.88300 | 40.8 |
| 8 | 10.743 | 5.84 | | |
| 9 | −28.262 | 0.90 | 1.88300 | 40.8 |
| 10 | 31.401 | 0.15 | | |
| 11 | 24.422 | 5.07 | 1.80610 | 33.3 |
| 12 | −26.192 | 0.56 | | |
| 13 | −20.525 | 0.90 | 1.80400 | 46.6 |
| 14 | 74.657 | 2.99 | 1.80518 | 25.4 |
| 15 | −38.539 | (variable) | | |
| 16(stop) | ∞ | 1.18 | | |
| 17 | 33.996 | 4.00 | 1.62588 | 35.7 |
| 18 | −31.000 | 0.15 | | |
| 19 | 31.669 | 3.11 | 1.49700 | 81.5 |
| 20 | −22.214 | 0.90 | 1.84666 | 23.8 |
| 21 | 292.753 | (variable) | | |
| 22* | −40.156 | 1.10 | 1.85135 | 40.1 |
| 23 | 19.401 | 2.21 | 1.84666 | 23.8 |
| 24 | 149.411 | (variable) | | |
| 25 | 37.445 | 5.46 | 1.48749 | 70.2 |
| 26 | −24.749 | 0.15 | | |
| 27 | 63.867 | 5.78 | 1.48749 | 70.2 |
| 28 | −18.806 | 1.60 | 1.83400 | 37.2 |
| 29* | 258.479 | 0.80 | | |
| 30 | −151.302 | 2.83 | 1.48749 | 70.2 |
| 31 | −30.761 | (variable) | | |
| Image plane | ∞ | | | |

Aspherical surface data

Sixth surface

K = 0.00000e+000   A 4 = 4.27383e−005   A 6 = −1.94337e−007
A 8 = 5.58378e−010   A10 = −7.60750e−013
Twenty-second surface K = 0.00000e+000   A 4 = 1.22082e−006   A 6 = −1.51414e−008
A 8 = −1.23396e−009   A10 = 2.56497e−011
Twenty-ninth surface K = 0.00000e+000   A 4 = 1.36580e−005   A 6 = 7.98818e−010
A 8 = −3.66214e−011   A10 = 5.68128e−014

Various kinds of data
Zoom ratio 5.30

| | Wide angle | Intermediate | Telephoto |
|---|---|---|---|
| Focal length | 15.50 | 37.96 | 82.17 |
| F-number | 3.53 | 4.67 | 5.85 |
| Field angle | 41.39 | 19.79 | 9.44 |
| Image height | 13.66 | 13.66 | 13.66 |

-continued

| | | | |
|---|---|---|---|
| Total lens length | 129.52 | 149.52 | 169.52 |
| BF | 35.46 | 45.51 | 57.91 |
| d 5 | 2.40 | 22.01 | 35.47 |
| d15 | 17.46 | 7.80 | 1.93 |
| d21 | 1.69 | 8.60 | 12.25 |
| d24 | 11.13 | 4.22 | 0.57 |
| d31 | 35.46 | 45.51 | 57.91 |

Focal length of each unit

| Unit | Start surface | Focal length |
|---|---|---|
| 1 | 1 | 78.64 |
| 2 | 6 | −12.22 |
| 3 | 16 | 27.04 |
| 4 | 22 | −36.59 |
| 5 | 25 | 32.45 |

Numerical Embodiment 3

Surface data

| Surface number | r | d | nd | vd |
|---|---|---|---|---|
| 1 | 107.959 | 1.90 | 1.84666 | 23.8 |
| 2 | 53.518 | 8.86 | 1.61800 | 63.4 |
| 3 | 608.940 | 0.15 | | |
| 4 | 46.076 | 5.65 | 1.80400 | 46.6 |
| 5 | 103.360 | (variable) | | |
| 6* | 92.673 | 0.05 | 1.51640 | 52.2 |
| 7 | 59.065 | 1.20 | 1.88300 | 40.8 |
| 8 | 10.422 | 5.95 | | |
| 9 | −24.511 | 0.90 | 1.88300 | 40.8 |
| 10 | 42.345 | 0.15 | | |
| 11 | 27.155 | 4.68 | 1.80610 | 33.3 |
| 12 | −26.937 | 0.73 | | |
| 13 | −17.879 | 0.90 | 1.80400 | 46.6 |
| 14 | 63.430 | 2.71 | 1.80518 | 25.4 |
| 15 | −31.914 | (variable) | | |
| 16(stop) | ∞ | 0.99 | | |
| 17 | 31.488 | 2.83 | 1.62588 | 35.7 |
| 18 | −32.084 | 0.15 | | |
| 19 | 31.375 | 3.27 | 1.49700 | 81.5 |
| 20 | −20.134 | 0.90 | 1.84666 | 23.8 |
| 21 | 609.979 | (variable) | | |
| 22* | −36.813 | 1.10 | 1.85135 | 40.1 |
| 23 | 18.208 | 2.28 | 1.84666 | 23.8 |
| 24 | 118.432 | (variable) | | |
| 25 | 26.924 | 5.94 | 1.48749 | 70.2 |
| 26 | −25.745 | 0.15 | | |
| 27 | 85.663 | 5.83 | 1.48749 | 70.2 |
| 28 | −16.542 | 1.60 | 1.85006 | 40.2 |
| 29* | 256.734 | 1.13 | | |
| 30 | −103.383 | 4.50 | 1.48749 | 70.2 |
| 31 | −25.252 | (variable) | | |
| Image plane | ∞ | | | |

Aspherical surface data

Sixth surface

K = 0.00000e+000   A 4 = 4.05606e−005   A 6 = −1.93828e−007
A 8 = 6.40753e−010   A10 = −1.01287e−012
Twenty-second surface K = 0.00000e+000   A 4 = 1.00861e−005   A 6 = −4.41577e−008
A 8 = 1.67887e−009   A10 = −1.76717e−011
Twenty-ninth surface K = 0.00000e+000   A 4 = 2.34129e−005   A 6 = 2.73741e−008
A 8 = −3.36755e−010   A10 = 9.36789e−013

-continued

Various kinds of data
Zoom ratio 6.45

|  | Wide angle | Intermediate | Telephoto |
|---|---|---|---|
| Focal length | 15.50 | 35.77 | 99.95 |
| F-number | 3.63 | 4.65 | 5.73 |
| Field angle | 41.39 | 20.90 | 7.78 |
| Image height | 13.66 | 13.66 | 13.66 |
| Total lens length | 131.77 | 152.10 | 177.78 |
| BF | 35.57 | 50.18 | 65.60 |
| d 5 | 2.31 | 21.62 | 41.36 |
| d15 | 20.91 | 10.30 | 2.00 |
| d24 | 6.80 | 3.82 | 2.63 |
| d31 | 35.57 | 50.18 | 65.60 |

Various kinds of focal length

| Unit | Start surface | Focal length |
|---|---|---|
| 1 | 1 | 80.05 |
| 2 | 6 | −11.72 |
| 3 | 16 | 65.51 |
| 4 | 25 | 32.11 |

TABLE 1

| CONDITIONAL EXPRESSION | EMBODIMENT 1 | EMBODIMENT 2 | EMBODIMENT 3 |
|---|---|---|---|
| 1 | 4.8754 | 5.0735 | 5.1645 |
| 2 | 2.0658 | 2.0935 | 2.0716 |
| 3 | 0.8707 | 0.9698 | 0.8729 |
| 4 | 1.851 | 1.834 | 1.851 |
| 5 | 0.1431 | 0.1487 | 0.1173 |

Next, an embodiment where a zoom lens of the present invention is used as an image pickup optical system will be described with reference to FIG. 10. In FIG. 10, reference numeral 10 denotes a single-lens reflex camera body, and reference numeral 11 denotes an interchangeable lens which mounts the zoom lens of the present invention. Reference numeral 12 denotes a photosensitive surface such as a silver salt film that records an object image obtained through the interchangeable lens 11 or a solid-state image pickup element (a photoelectric conversion element) that receives light of the object image. Reference numeral 13 denotes a finder optical system which observes the object image from the interchangeable lens 11, and reference numeral 14 denotes a quick return mirror which rotates to switch so that the object image from the interchangeable lens 11 is transmitted to either the photosensitive surface 12 or a finder optical system 13.

When the object image is observed by a finder, an erected image of the object image which has been imaged on a focusing screen 15 via the quick return mirror 14 is obtained by a pentaprism 16 before observing the image magnified by an eyepiece optical system 17. At the time of taking an image, the quick return mirror 14 rotates in an arrow direction and the object image is imaged to be recorded in a photosensitive surface recorder 12. Thus, the zoom lens of the present invention can be applied to an optical device (an image pickup apparatus) such as an interchangeable lens for a single-lens reflex camera to realize an optical device having a high optical performance. Similarly, the present invention can also be applied to a single-lens reflex camera (SLR) which does not have any quick return mirror. Further, the zoom lens of the present invention can also be applied to a video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-126206, filed on May 26, 2009, which is hereby incorporated by reference herein in its entirety.

What is claimed is:

1. A zoom lens comprising:
a first lens unit having a positive refractive power, a second lens unit having a negative refractive power, and a rear group including at least two lens units and having a positive refractive power as a whole in an entire zoom range, in order from an object side to an image side,
wherein an interval of each of the lens units is configured to change in a zoom operation,
the rear group includes a lens unit R having a positive refractive power at the most image side of the rear group,
the lens unit R includes a lens having a concave surface at the image side and the concave surface having an aspherical surface shape where a negative refractive power becomes stronger with increasing distance from an optical axis, and
the following conditional expressions are satisfied, $4.4 < f1/fw < 5.5$ $1.8 < fR/fw < 2.3$ $1.8 < Na < 2.0$ $0.05 < |f2/ft| 0.1487$ where f1 is a focal length of the first lens unit, fR is a focal length of the lens unit R, fw is a focal length of a whole system at a wide-angle end, Na is a refractive index of a material of the lens of the aspherical surface shape, f2 is a focal length of the second lens unit, and ft is a focal length of a whole system at a telephoto end.

2. A zoom lens according to claim 1,
wherein the lens unit R includes a lens Rp, which is located at the most object side of the lens unit R and the lens Rp has a positive refractive power, and
the following conditional expression is satisfied, $0.6 < fRp/fR < 1.2$ where fRp is a focal length of the lens Rp.

3. A zoom lens according to claim 1,
wherein the rear group includes a lens unit IS having a negative refractive power which moves in a direction having a component perpendicular to an optical axis to move an imaging position.

4. A zoom lens according to claim 1,
wherein the lens unit R consists of a positive lens having a biconvex shape, a cemented lens which is made by cementing a positive lens having a biconvex shape and a negative lens having a biconcave shape, and a positive lens having a convex shape surface at the image side, in order from the object side to the image side.

5. A zoom lens according to claim 1,
wherein the rear group consists of a third lens unit having a positive refractive power and a fourth lens unit having a positive refractive power in order from the object side to the image side.

6. A zoom lens according to claim 1,
wherein the rear group consists of a third lens unit having a positive refractive power, a fourth lens unit having a negative refractive power, and a fifth lens unit having a positive refractive power, in order from the object side to the image side.

7. An image pickup apparatus comprising:
a zoom lens; and
a solid-state image pickup element configured to receive light of an image formed by the zoom lens,
wherein the zoom lens includes a first lens unit having a positive refractive power, a second lens unit having a negative refractive power, and a rear group including at least two lens units and having a positive refractive power as a whole in an entire zoom range, in order from an object side to an image side,
an interval of each of the lens units is configured to change in a zoom operation,
the rear group includes a lens unit R having a positive refractive power at the most image side of the rear croup,
the lens unit R includes a lens having a concave surface at the image side and the concave surface having an aspherical surface shape where a negative refractive power becomes stronger with increasing distance from an optical axis, and
the following conditional expressions are satisfied, $$4.4 < f1/fw < 5.5$$

$$1.8 < fR/fw < 2.3$$

$$1.8 < Na < 2.0$$

$$0.05 < |f2/ft| 0.1487$$

where f1 is a focal length of the first lens unit, fR is a focal length of the lens unit R, fw is a focal length of a whole system at a wide-angle end, Na is a refractive index of a material of the lens of the aspherical surface shape, f2 is a focal length of the second lens unit, and ft is a focal length of a whole system at a telephoto end.

* * * * *